(12) United States Patent
Segawa et al.

(10) Patent No.: US 7,724,393 B2
(45) Date of Patent: May 25, 2010

(54) JUDGING WHETHER TRAPPING PROCESS IS REQUIRED OR NOT

(75) Inventors: Hiroyuki Segawa, Kyoto (JP); Minoru Sawada, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 1249 days.

(21) Appl. No.: 10/983,575

(22) Filed: Nov. 9, 2004

(65) Prior Publication Data

US 2005/0099642 A1    May 12, 2005

(30) Foreign Application Priority Data

Nov. 10, 2003  (JP)  ............................ 2003-379556
Jun. 30, 2004  (JP)  ............................ 2004-193470

(51) Int. Cl.
*H04N 1/60*  (2006.01)
*H04N 1/40*  (2006.01)

(52) U.S. Cl. ...................... 358/1.9; 358/3.24; 358/3.26

(58) Field of Classification Search .................. 358/1.9, 358/1.1, 1.4, 2.1, 515, 518, 529, 504, 3.26, 358/540, 3.24, 3.02, 1.18, 1.2, 1.3, 1.6, 3.29, 358/1.5, 1.8, 527, 530; 382/167, 162, 266, 382/163, 164, 165, 166; 347/171, 172, 173, 347/174, 175, 176, 178, 179, 177, 232; 399/1, 399/39, 54, 298, 321, 344

See application file for complete search history.

(56) References Cited

U.S. PATENT DOCUMENTS

| | | | | |
|---|---|---|---|---|
| 5,295,236 A | * | 3/1994 | Bjorge et al. | 715/206 |
| 5,542,052 A | * | 7/1996 | Deutsch et al. | 345/589 |
| 5,666,543 A | * | 9/1997 | Gartland | 715/205 |
| 5,923,821 A | * | 7/1999 | Birnbaum et al. | 358/1.9 |
| 6,345,117 B2 | * | 2/2002 | Klassen | 382/167 |
| 7,123,381 B2 | * | 10/2006 | Klassen | 358/1.9 |
| 2003/0063301 A1 | * | 4/2003 | Klassen | 358/1.9 |

FOREIGN PATENT DOCUMENTS

WO    WO 95/20796    8/1995

* cited by examiner

*Primary Examiner*—Dov Popovici
(74) *Attorney, Agent, or Firm*—McDermott Will & Emery LLP

(57) ABSTRACT

In trapping process of a multicolor image, it is judged whether trapping process is required or not, and trapping process is performed only when required. Specifically, trapping process is executed when in a portion where a plurality of figures constituting an image overlap, the plate color value of a relatively lower figure is erased or overwritten. This enables to execute trapping process only when there is the danger that a gap occurs in a boundary portion where different two colors are adjacent each other.

4 Claims, 15 Drawing Sheets

F I G . 2
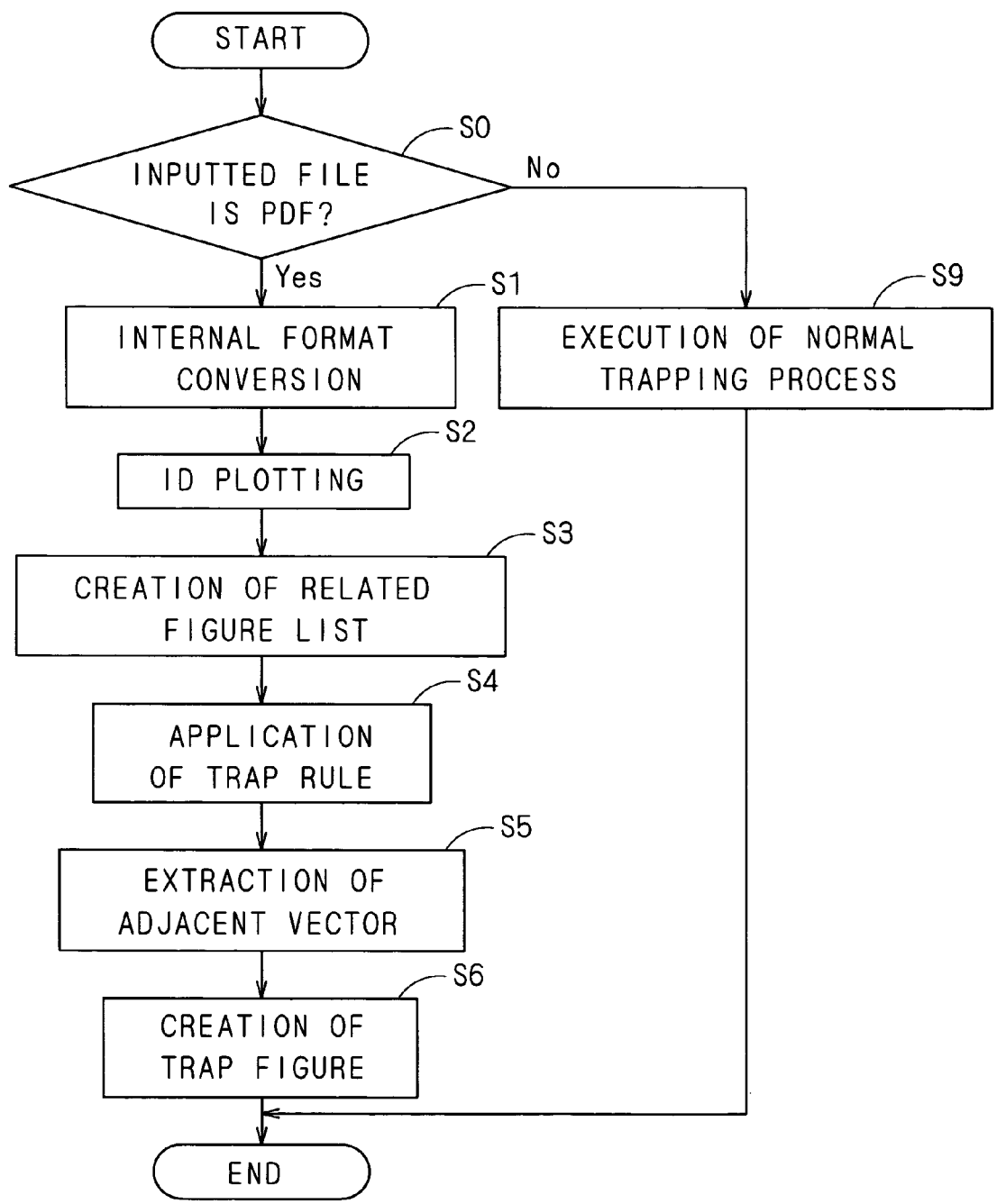

F I G. 1 2 A
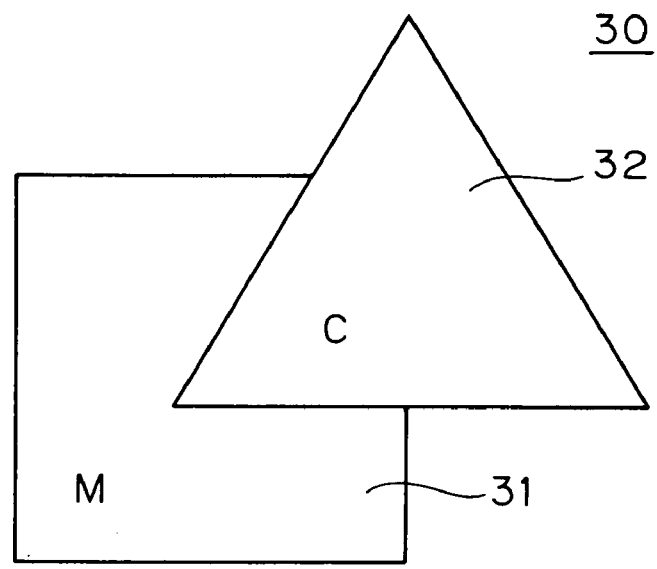
F I G. 1 2 B
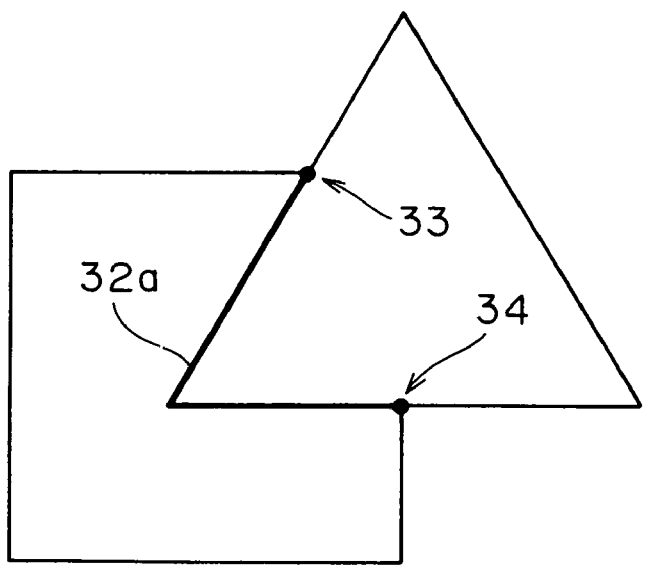

JUDGING WHETHER TRAPPING PROCESS IS REQUIRED OR NOT

BACKGROUND OF THE INVENTION

1. Field of the Invention

The present invention relates to a trapping technique applied to a boundary portion where two different colors are adjacent each other in an image that is configured by allocating a plurality of figures having a relative upper and lower position order.

2. Description of the Background Art

There has heretofore been known the technique of forming an image on a printing paper by multicolor printing by using a plurality of press plates, which correspond to respective colors (process colors), such as C (cyan), M (magenta), Y (yellow), and K (black), and special colors.

In the image formed by such a multicolor printing, there is a boundary portion where two different colors are adjacent each other. In cases where when an image is transferred from press plates to a printing paper, a drift occurs at the positions of the press plates that correspond to respective colors, or expansion and contraction occur in the printing paper, there arises the disadvantages that a gap is left in this boundary portion and the paper color of the printing paper peeps out, and the like.

In order to avoid such a gap, "trapping process" has heretofore been performed in a prepress step. Trapping process is executable by allocating, for example, along a boundary portion where two colors are adjacent each other on an image, a narrow figure (hereinafter referred to as a "trap figure") composed of the color components of the two colors.

Recently, the editing process of images in the prepress step is often performed on a computer. A series of steps relating to trapping process are also implemented by executing a predetermined program on a computer.

When performing editing on a computer in a prepress process, in some cases, an image (page) is handled as data obtained by allocating a plurality of figures to predetermined positions. Between the plurality of figures, the order of relative upper and lower positions (the front and the rear on the page space) are designated in some cases.

However, there are various methods of determining as to which color an overlapped portion is to have on an image, when a certain figure is allocated so as to overlap in its upper part with other figure. For example, there are the following methods: "knock out" that employs the color of the upper figure with regard to the color of the overlapped portion; and "overprint" in which the color of the upper figure is overlaid on the color of the lower figure to obtain a combination color of the two. Alternatively, there is the method of "irregular overprint" that employs a combination color of the colors of both figures only under regular requirements, and employs the color of the upper figure in other cases.

Depending on which one of these various methods is to be applied to, there arises a difference in the need for trapping process with respect to an adjacent boundary portion between the color of the overlapped portion of two figures and the color of the lower figure. In addition, when performing the "irregular overprint," there arises a difference in the need for trapping process even by the color relationship of two colors allocated so as to overlap with each other.

SUMMARY OF THE INVENTION

The present invention is directed to a trapping method.

According to the present invention, a trapping method is a method for performing trapping process of a boundary portion where two different colors are adjacent each other in an image that is configured by allocating a plurality of figures having a relative upper and lower position order. The method includes; (a) the step of judging whether trapping process is required or not, based on a color state in a portion where the plurality of figures overlap; and (b) the step of performing trapping process when judged that trapping process is required in the step (a).

Based on the color state in the portion where a plurality of figures overlap, it is judged whether trapping process is required or not. Therefore, trapping process is executable timely as needed.

Preferably, in the step (a), it is judged that trapping process is required when a plate color value of a relatively lower figure is erased or overwritten in the portion where the plurality of figures overlap.

Trapping process is executable only when there is the danger that a gap occurs in a boundary portion where different two colors are adjacent each other.

The present invention is also directed to a trapping apparatus, a program, and a printing system.

Accordingly, it is an object of the present invention to provide a technique with which it is able to execute trapping process timely as needed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flowchart showing a procedure of trapping process;

FIGS. 12A and 12B are diagrams showing examples of extracting an adjacent vector;

DESCRIPTION OF THE PREFERRED EMBODIMENTS

Preferred embodiments of the present invention will be described below with reference to the drawings.

Figure 1:
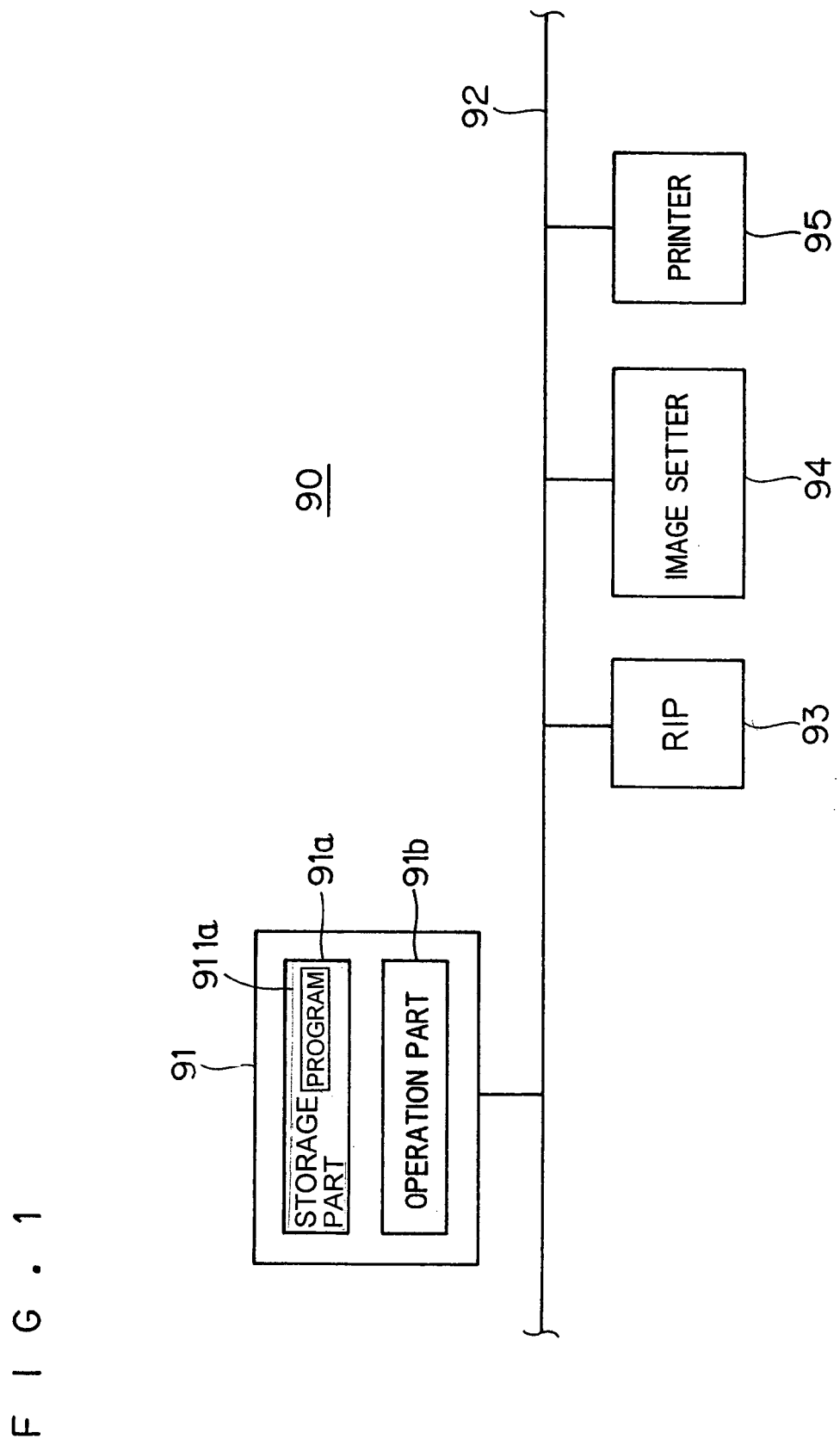
FIG. 1 is a diagram showing conceptually the configuration of a printing system.

A computer (trapping apparatus) 91, as shown conceptually in FIG. 1, is a general computer having such as a storage part (a hard disk, a ROM, a RAM, etc.) 91a, and an operation part (CPU) 91b. The following steps of trapping process are executed under a program 911a on this general computer (trapping apparatus) 91. Specifically, by referring to the program 911a and necessary data installed in the storage part 91a, the operation part 91b within the computer 91 executes the steps relating to trapping process.

In addition, as shown in FIG. 1, the computer 91 is connected via a network 92 to a raster image processor (RIP) 93, and further electrically connected to an image output part including such as an image setter 94 and a printer 95. These configure a printing system 90 as a whole.

FIG. 2 is a flowchart showing the procedure of processing in accordance with the present invention. This processing is executed in a prepress step of multicolor printing. The procedure will be different for different formats of an image file inputted.

When an image file is inputted to the computer 91, the format of the inputted image file is judged first (step S0). Here, it is judged whether the file format is PDF or not. When the file format is PDF, the flow advances to internal format conversion (step S1). Thereafter, the following steps of ID plotting (step S2), creation of a related figure list (step S3), application of trap rule (step S4), extraction of an adjacent vector (step S5), and creation of a trap figure (step S6) advance in sequence. In steps S1 to S6, trapping process is to be executed only under predetermined requirements, as described later.

On the other hand, when the file format is not PDF in step S0, the flow advances to the normal trapping process (step S9), and trapping process is executed irrespective of the predetermined requirements as above described.

Thus, this preferred embodiment is configured so as to execute different procedures (steps S1 to S6, or step S9), depending on whether the file format is PDF or other format. This is because PDF and other file format have the following characteristics, respectively.

An image (page) described in PDF is a collection of a plurality of figures, and configured by allocating (laying out) these figures at their respective predetermined positions. The color of a portion where the plurality of figures overlap can be expressed by a plurality of methods such as "knock out" and "overprint." Therefore, depending on the overprint setting and predetermined requirements related thereto, there are the case of requiring trapping process and the case of requiring no trapping process. Steps S1 to S6 are to judge the need for trapping process.

To the contrary, an image described in a format other than PDF requires no setting such as "OPM" of overprint attribute to be described later, so that trapping process is required irrespective of such a setting. Therefore, in step S9, trapping process is executed without judging process relating to overprint. As used herein, the term "format other than PDF" denotes, for example, bit map, TIFF, and the native format of application with which the layout of an image is created.

Even when the inputted image file is of a format other than PDF, if it is possible to perform setting such as "OPM" of overprint attribute" to be described later, the flow may advance to steps S1 to S6. Steps S1 to S6 will now be described in sequence.

<1. Internal Format Conversion>

Figure 3:
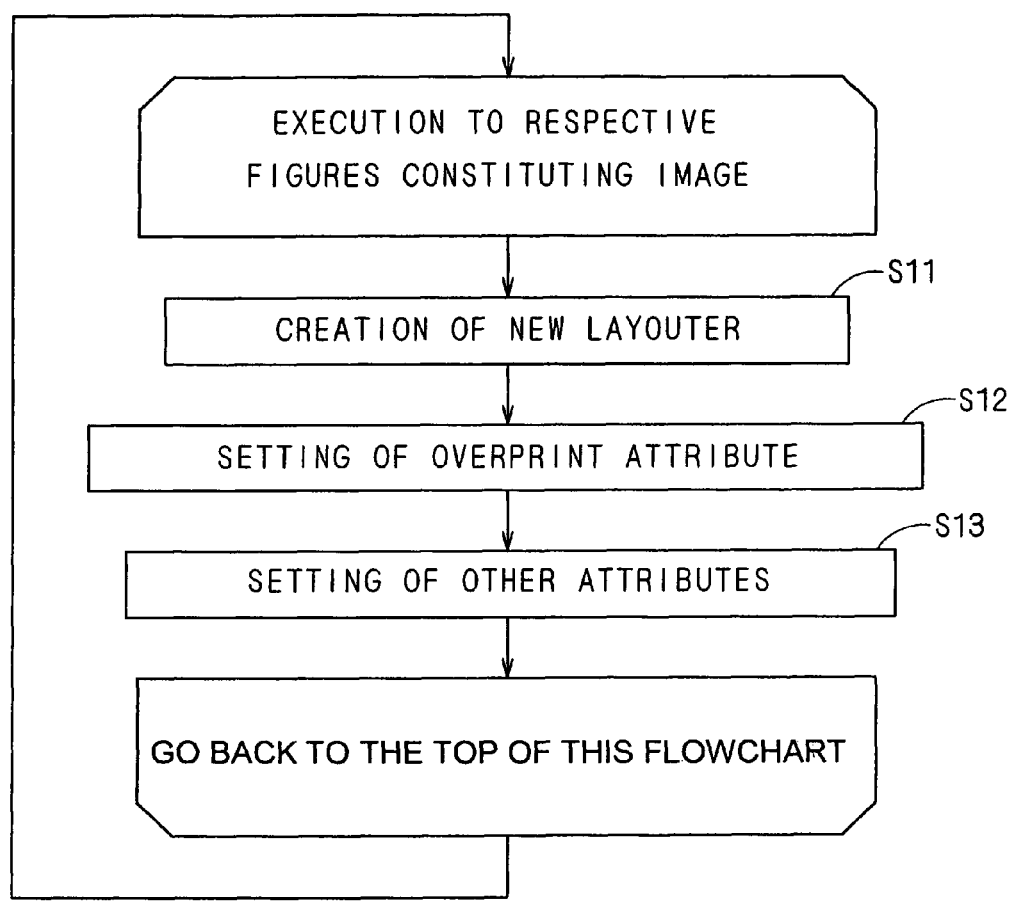
FIG. 3 is a flowchart showing a procedure of internal format conversion.

As shown in the flowchart of FIG. 3, in the process of the internal format conversion in step S1, creation of a new layouter (step S11), setting of overprint attribute (step S12), and setting of other attributes such as color, size, etc. (step S13) are performed in sequence with respect to figures constituting an image. The attributes of the respective figures so set herein are stored in the storage part 91a in the computer 91. These are to be referred to when setting the attributes of a trap figure in the subsequent step S4.

Overprint attribute set in step S12 is now described in detail. Overprint attribute is an attribute set in the units of figures constituting an image. That is, the attribute is used to determine, when other figure is allocated on a lower side from a certain figure, which color a portion where both figures overlap is to have on the image. In this preferred embodiment, assume that three types of settings: "OP=false"; "OP=true, OPM=1"; and "OP=true, OPM=0" are selectable as an overprint attribute.

The expression "OP=false" means that no "overprint" is executed, that is, means the above-mentioned "knock out." If a certain figure is set to "OP=false," the color of this figure (the upper figure) is employed with respect to the portion overlapping with other figure allocated to the lower side. Here, the colors assigned to the respective figures are ones obtained by designating the respective plate color values (dot percents) of process colors such as CMYK, or special colors, in the range of 0 to 100%. Whereas in the case of "OP=false," as to the overlapped portion, the value of the plate color relating to the lower figure is to be erased, and the value of the plate color relating to the upper figure is to be overwritten.

Figure 4A:
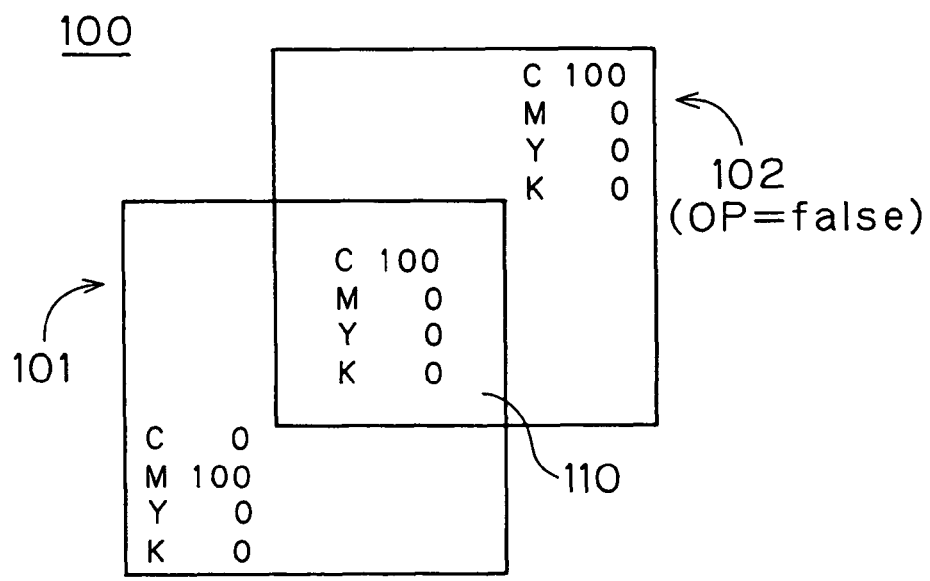
FIGS. 4A and 4B are diagrams showing examples of images including a figure set to "OP=false"
Figure 4B:
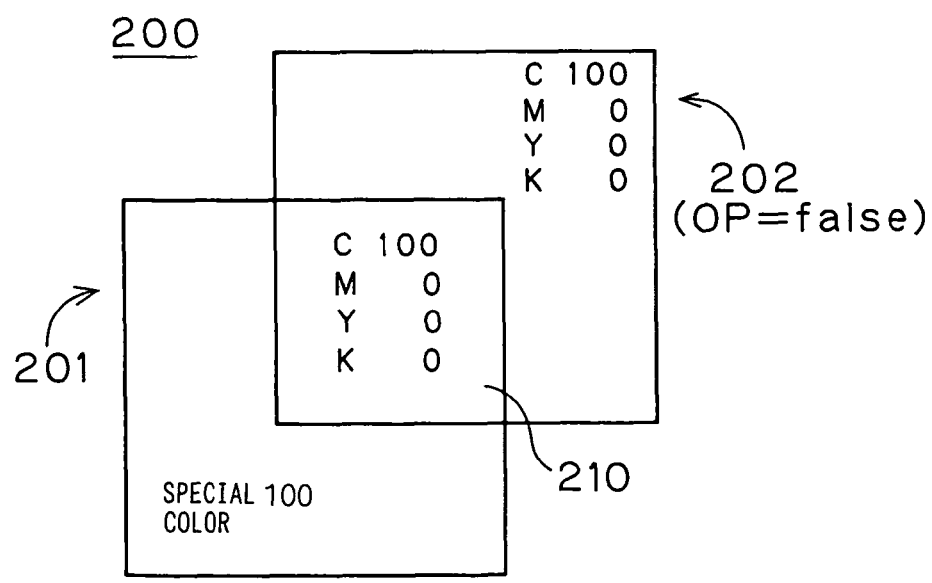

FIGS. 4A and 4B show examples of images including a figure set to "OP=false." An image 100 shown in FIG. 4A is an image in which a FIG. 101 is allocated so as to overlap in its upper part with a FIG. 102, wherein the overprint attribute of the FIG. 102 is set to "OP=false." In this case, when specifying the color of the FIG. 101 as "C:0, M:100, Y:0, K:0 (hereat and hereafter expressed in %)," and the color of the FIG. 102 as "C:100, M:0, Y:0, K:0," the color of the FIG. 102 is employed with respect to a portion 110 where both figures overlap, which results in "C:100, M:0, Y:0, K:0."

An image 200 shown in FIG. 4B is an image in which a FIG. 201 is allocated so as to overlap in its upper part with a FIG. 202, wherein the overprint attribute of the FIG. 202 is set to "OP=false." In this case, when specifying the color of the FIG. 201 as "special color:100" and the color of the FIG. 202 as "C:100, M:0, Y:0, K:0," the color of the FIG. 202 is employed with respect to a portion 210 where both figures overlap, which results in "C:100, M:0, Y:0, K:0."

On the other hand, the expression "OP=true" indicates execution of "overprint," and "OPM=1" indicates constant execution of "overprint." When a certain figure is set to "OP=true, OPM=1," the portion overlapping with other figure allocated to the lower side constantly has a combination color of the two figures. As used here, the term "combination color" denotes a color obtained in the following manner that with regard to respective plate colors, the values of the two figures are compared, and (i) when both have values other than 0, a greater value (a maximum value) is employed; and (ii) when one value is 0, the other value is employed. Therefore, when a plate color other than the plate color defining the color of the upper figure (for example, a special color) is contained in the lower figure, the component of that plate color is also added in the overlapped portion.

Figure 5A:
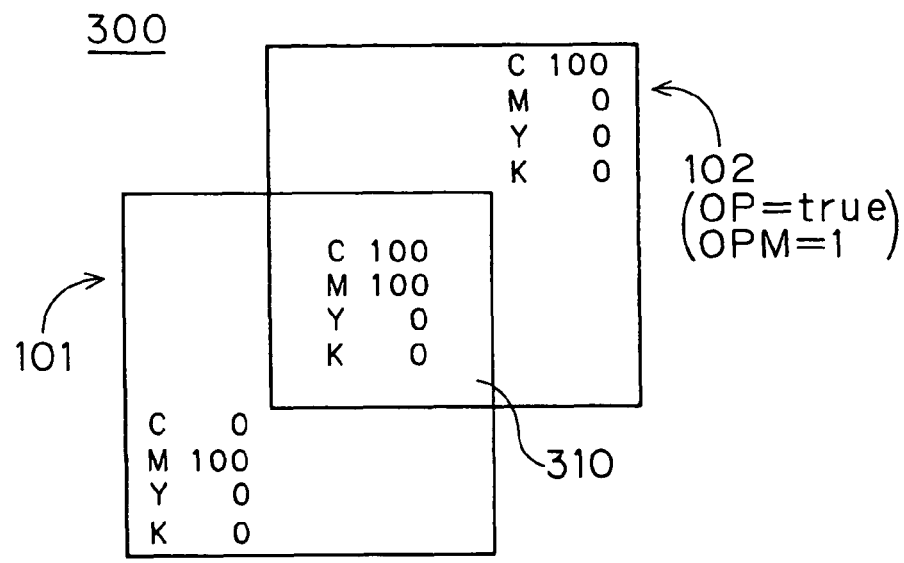
FIGS. 5A and 5B are diagrams showing examples of images including a figure set to "OP=true, OPM=1"
Figure 5B:
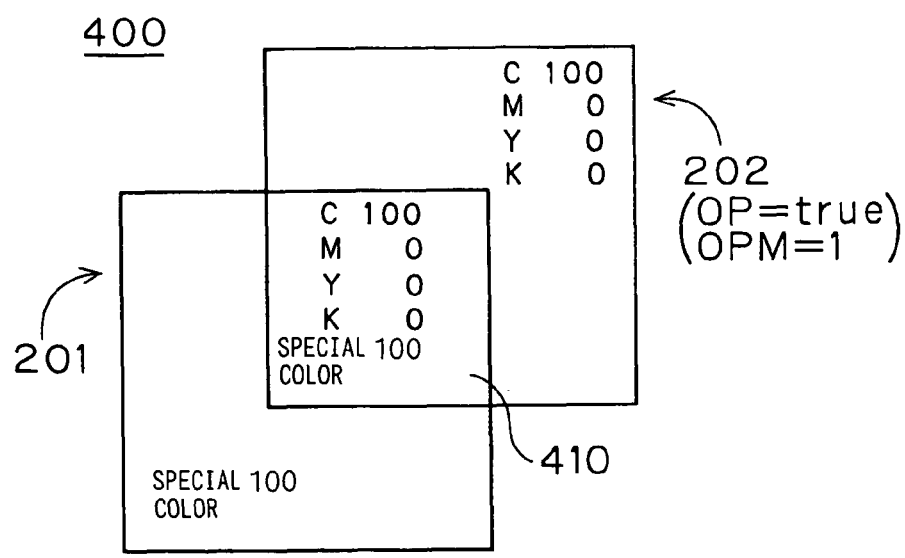

FIGS. 5A and 5B show examples of images including a figure set to "OP=true, OPM=1." Like the image 100, an image 300 shown in FIG. 5A is an image in which a FIG. 101 is allocated so as to overlap in its upper part with a FIG. 102, wherein the overprint attribute of the FIG. 102 is set to "OP=true, OPM=1." In this case, a portion 310 where both figures overlap results in the color of "C:100, M:100, Y:0, K:0," which is obtained by combining the colors of the two figures.

Like the image 200, an image 400 shown in FIG. 5B is an image in which a FIG. 201 is allocated so as to overlap in its upper part with a FIG. 202, wherein the overprint attribute of the FIG. 202 is set to "OP=true, OPM=1." In this case, a portion 410 where both figures overlap results in the color of "C:100, M:0, Y:0, special color:100," which is obtained by combining the colors of the two figures.

To the contrary, the expression "OP=true, OPM=0" indicates that "knock out" is performed only with respect to the plate color defining the color of a certain figure (i.e., a plate color having a value, and a plate color having a value 0% is included), and "overprint" is performed with respect to other plate colors. In other words, when a certain figure is set to "OP-true, OPM=0," the value of this figure is employed with respect to the plate colors defining the color of this figure, and the value of a lower figure is employed as other plate colors. Accordingly, when the color of this figure is specified by four plate colors of CMYK, and the color of the figure allocated to the lower side is also specified by four colors of CMYK, the color of the lower figure is employed with respect to the portion where the two figures overlap. However, if the color of the figure allocated to the lower side is a special color, the portion where the two figures overlap has a combination color of the two figures.

Figure 6A:
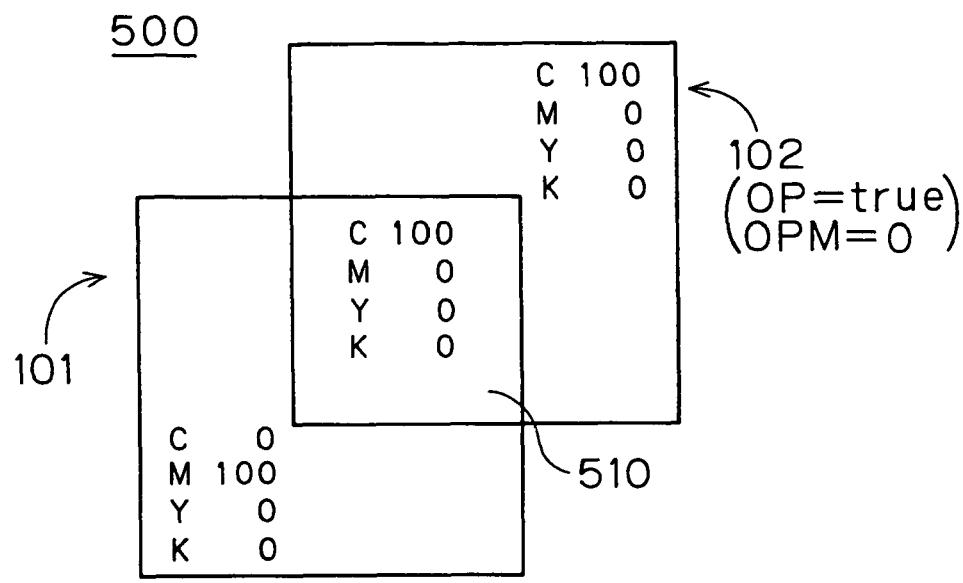
FIGS. 6A and 6B are diagrams showing examples of images including a figure set to "OP=true, OPM=0.
Figure 6B:
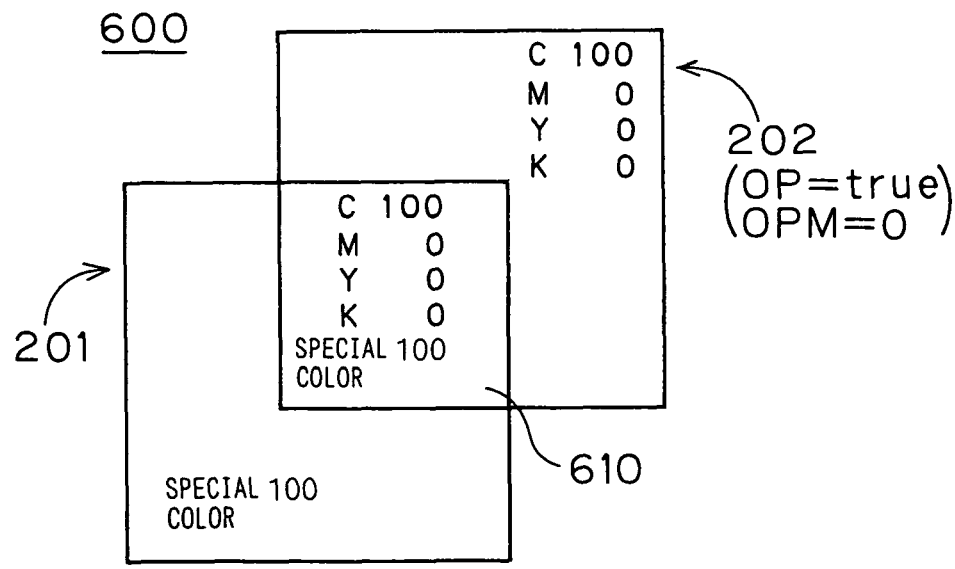

FIGS. 6A and 6B show examples of images including a figure set to "OP=true, OPM=0." Like the image 100, an image 500 shown in FIG. 6A is an image in which a FIG. 101 is allocated so as to overlap in its upper part with a FIG. 102, wherein the overprint attribute of the FIG. 102 is set to "OP=true, OPM=0." In this case, the plate colors CMYK defining the lower FIG. 101 are contained in the plate colors CMYK defining the upper FIG. 102. Accordingly, the plate color value of the FIG. 102 is employed with respect to a portion 510 where both figures overlap, resulting in the color of "C:100, M:0, Y:0, K:0."

Like the image 200, an image 600 shown in FIG. 6B is an image in which a FIG. 201 is allocated so as to overlap in its upper part with a FIG. 202, wherein the overprint attribute of the FIG. 202 is set to "OP=true, OPM=0." In this case, the special color defining the lower FIG. 201 is not contained in the plate colors CMYK defining the upper FIG. 202. Accordingly, a portion 610 where the two figures overlap has a combination color of these, namely, "C:100, M:0, Y:0, K:0, special color:100."

<2. ID Plotting>

In step S2, on the pixels on a bit map that correspond to positions occupied by the figures constituting the image, the IDs of these figures are displayed. The IDs are numerals for identifying the respective figures and also designating the relative upper and lower position order of the figures. For example, the numeral 1 is assigned to the image allocated to the lowermost position, and the numerals 2, 3, . . . are assigned to other images in the order of ascending order of position.

Figure 7A:
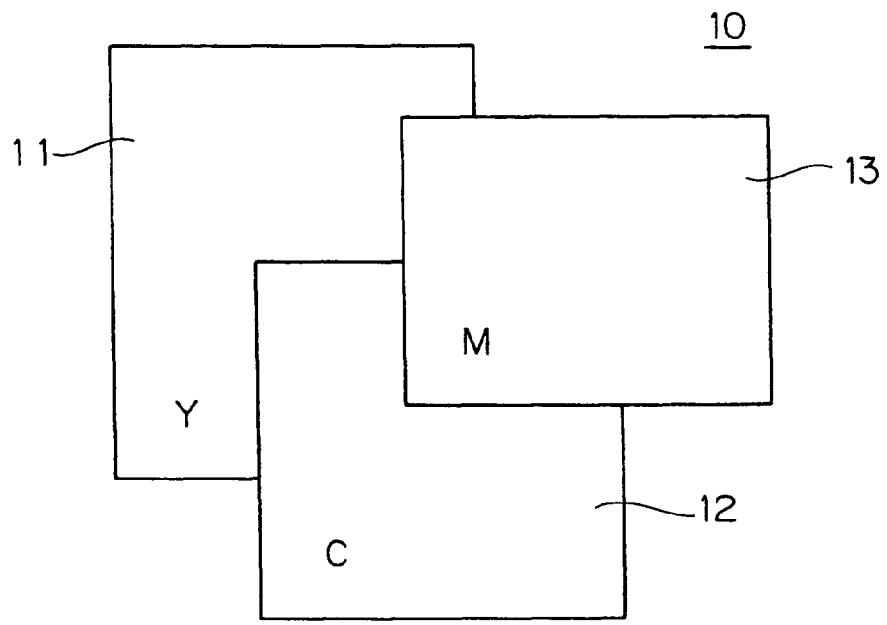
FIGS. 7A and 7B are diagrams showing examples of ID plotting.

As one example, consider the case where an image 10 as shown in FIG. 7A is used as an object, in which three rectangles 11, 12 and 13 are allocated so as to have portions overlapping to each other. The relationship between the three rectangles 11, 12 and 13 is that the rectangle 11 is the lowermost and the rectangle 13 is the uppermost. Therefore, let the IDs of the rectangles 11, 12 and 13 be 1, 2, and 3, respectively. In the image 10 illustrated in FIG. 7A, the overprint attribute of the rectangles 12 and 13 is set to "OP=false," and hence the color of the upper figure appears in the portion where the respective figures overlap.

Figure 7B:
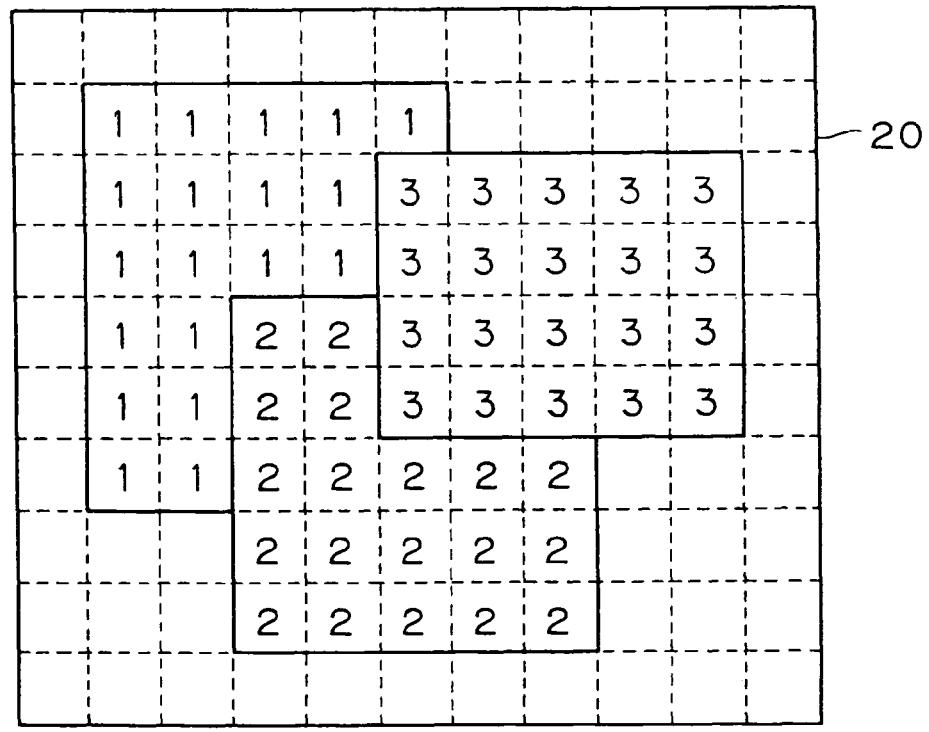

FIG. 7B shows the result of the ID plotting on the image 10 in step S2. As shown in FIG. 7B, the IDs of the respective figures are displayed at pixels that correspond to the positions occupied by the respective rectangles on a bit map 20. In other words, this is to display the rectangles 11, 12 and 13 by using the IDs on the bit map 20. Note that the ID of a relatively upper figure is preferentially displayed on the pixels locating at the positions where a plurality of figures overlap. Here, the overprint attribute of the rectangles 12 and 13 is "OP=false," from which it follows that the IDs are displayed in the allocation corresponding to the appearance of the image 10.

<3. Creation of Related Figure List>

Trapping process is performed in the units of figures constituting an image. In trapping process, a trap figure is allocated to a boundary portion where the contour of a figure used as an object (hereinafter referred to as an "objective figure") makes contact with the color of a lower figure. Therefore, a figure, which is lower than the objective figure and has an overlap with the objective figure or makes contact with the objective figure, becomes the figure relating to the trapping process of the objective figure (hereinafter referred to as a "lower related figure").

In step S3, lower related figures are selected when the respective figures are used an objective figure, and they are stored as a lower related figure list. In addition, in the trapping process of this preferred embodiment, figures that are upper than an objective figure and have a boundary portion with the objective figure (hereinafter referred to as an "upper related figure") are also selected and stored as an upper related figure list.

Figures registered in the lower related figure list and the upper related figure list are selected with the use of a bit map obtained by the ID plotting in step S2, and in the following method. First, the after-ID-plotting bit map is scanned vertically and laterally to read the ID displayed on each pixel. Next, if there is a pixel that is adjacent to a pixel corresponding to an objective figure, and displays an ID different from the ID of the objective figure, a figure containing this pixel is selected and registered in the lower related figure list when the ID of the selected figure is smaller than the ID of the objective figure, and in the upper related figure list when it is greater. Then, this registration process is executed on the cases where the respective figures constituting the image are used as an objective figure.

Figure 8:
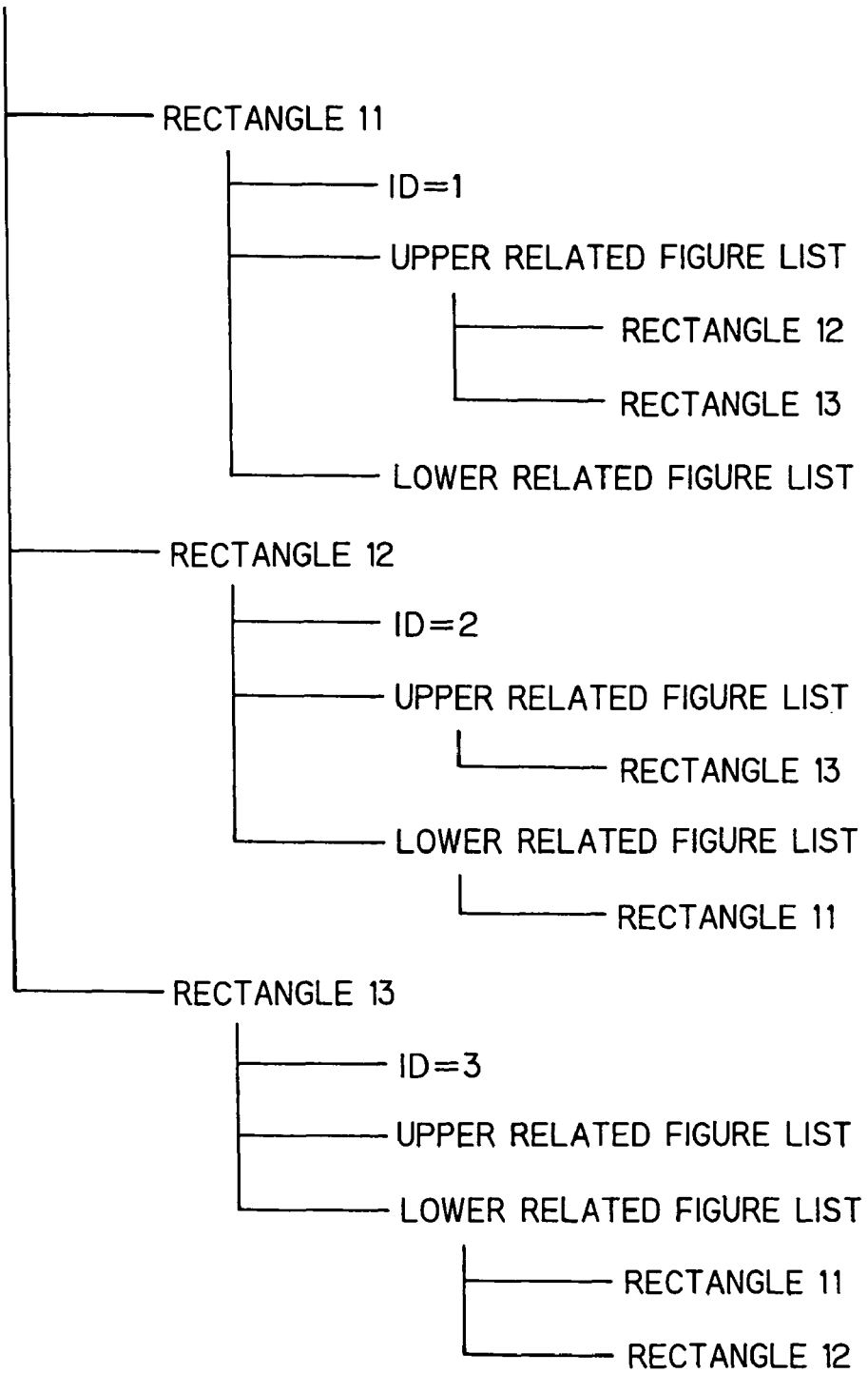
FIG. 8 is a diagram showing one example of the results of creating lower related figure lists and upper related figure lists.

FIG. 8 shows the result of creation of a lower related figure list and an upper related figure list when the rectangles 11, 12 and 13 are used as an objective figure, in the image 10 of FIG. 7A. In this case, the bit map 20 of FIG. 7B is scanned to select the figures registered in these related figure lists. As a result, the rectangles 12 and 13 are registered in the upper related figure list of the rectangle 11, and no figure is registered in the lower related figure list. The rectangle 13 is registered in the upper related figure list of the rectangle 12, and the rectangle 11 is registered in the lower related figure list. No figure is registered in the upper related figure list of the rectangle 13, and the rectangles 11 and 12 are registered in the lower related figure list.

Figure 9:
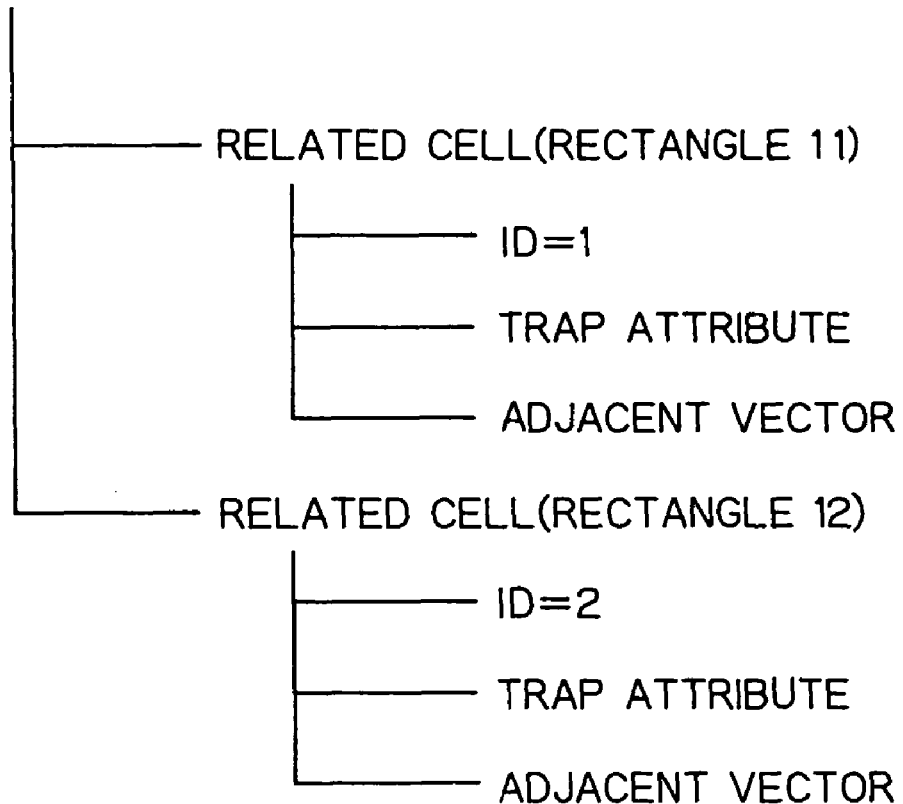
FIG. 9 is a diagram showing one example of the configuration of related cells.

Here, the upper related figure list and the lower related figure list are stored in the storage part 91a of the computer 91, as one hierarchy of page data, which has such a tree structure as schematically shown in FIG. 8, and then stored in a lower layer of the respective figure data. The figures registered in the lower related figure list and the upper related figure list are also stored in the storage part 91a of the computer 91, as a structure (hereinafter referred to as a "related cell"), which also contains information such as the ID thereof, and a trap attribute and an adjacent vector to be described later. FIG. 9 shows, as one example of this, the configuration of related cells concerning the lower related figure of the rectangle 13.

<4. Application of Trap Rule>

Step S4 is to set the attribute of a trap figure (hereinafter referred to as a "trap attribute"), which is to be allocated to a boundary portion between an objective figure and the lower related figures registered in step S3. The term "trap attribute" indicates, for example, the direction of allocation, the color, and the width of a trap figure, which are respectively set according to a predetermined rule (hereinafter referred to as a "trap rule").

For example, the direction of allocation of a trap figure, that is, as to whether the trap figure is allocated along the side of an objective figure in a boundary portion, or along the side of a lower related figure, or throughout both sides, is set on the basis of the colors of the objective figure and the lower related figure, and the like. In order to overshadow the trap figure, the direction of allocation is usually set to the side of either of the objective figure and the lower related figure, whichever has a lower luminance value (brightness).

The color of the trap figure is also set on the basis of the colors and the like of the objective figure and the lower related figure which sandwich the trap figure, and it is usually set to a combination color of the two figures. The width of the trap figure is set, on the basis of the size of an objective figure and the like, so as to have a width suitable for the size. The trap rule is a collection of such various rules for setting a trap attribute.

In this preferred embodiment, binary information as to whether trapping process between an objective figure and a lower related figure is to be executed or not is handled as a trap attribute, and this information is also set based on the trap rule. The flow of judging process when setting this information (i.e., the trap rule) will be described below in detail by referring to the flowchart of FIG. 10.

First, step S41 is to judge whether the color of an objective figure is a registration color or not. The term "registration color" denotes a color assigned to, for example, a register mark serving as a reference of registration, and is used in color proof per printing plate. When the color of an objective figure is a registration color, no execution of trapping process of the objective figure causes no damage to the appearance of the substantial portion of the image. Therefore, setting is performed so as not to execute trapping process in this case.

When the color of an objective figure is not a registration color, the flow advances to step S42 to judge whether the overprint attribute of the objective figure is "OP=false" or "OP=true." When the overprint attribute of the objective figure is "OP=true," the flow advances to step S43 to judge whether it is "OPM=0" or "OPM=1." Here, when the overprint attribute of the objective figure is "OP=true, OPM=1," the color of a portion overlapping with a lower related figure must always be a combination color of both figures, as in the portion 310 in FIG. 5A, and the portion 410 in FIG. 5B. Specifically, the color component of the lower related figure remains in the overlapped portion, and hence there is no danger that a gap occurs in a boundary portion. Accordingly, setting is performed so as not to execute trapping process in this case.

When the overprint attribute of the objective figure is "OP=true, OPM=0," the flow advances to step S44 to judge whether the plate colors defining the color of the objective figure is contained in the plate colors that appear in the lower related figure.

When no plate colors defining the color of the objective figure is contained in the plate colors that appear in the lower related figure, the portion where both figures overlap has a combination color of both figures. For example, if the FIG. 202 is the objective figure in the image 600 of FIG. 6B, only a special color may appear in the plate colors of the lower related FIG. 201, so that no plate colors CMYK defining the color of the objective figure is contained. In this case, the overlapped portion 610 has a combination color of both figures. Specifically, the color component of the lower related figure remains in the overlapped portion 610, and hence there is no danger that a gap occurs in a boundary portion. Accordingly, setting is performed so as not to execute trapping process in this case.

On the other hand, when the plate colors defining the color of the objective figure are contained in the plate colors that appear in the lower related figure, the value of at least one plate color contained in the lower related figure is erased or overwritten in the portion where both figures overlap. For example, if the FIG. 102 is the objective figure in the image 500 of FIG. 6A, the plate color M that appears in the lower related FIG. 101 is one of the plate colors CMYK defining the color of the objective figure. In this case, the color component "M:100" of the lower related figure is erased in the overlapped portion 510, and hence there is the danger that a gap occurs in a boundary portion. Accordingly, setting is performed so as to execute trapping process in this case.

Also, when the overprint attribute of the objective figure is "OP=false" in step S42, setting is performed so as to perform trapping process. The reason for this is as follows. Since the plate color value of the lower related figure is erased or overwritten in the portion where the objective figure and the lower related figure overlap, there is the danger that a gap occurs in a boundary portion.

When the execution of trapping process is determined, the flow advances to step S45 to select a method of trapping process. As a method of trapping process, there are also one in which an objective figure itself is thickened, or thinned, or thickened and thinned (i.e., independent trapping), besides the method of allocating a trap figure (i.e., interdependent trapping). Step S45 is to select any one of these methods. In general, the employment of independent trapping is advantageous in appearance, when a plurality of lower related figures are present with respect to one objective figure, and when an objective figure is a character, or the like.

When interdependent trapping is selected, the flow advances to step S46 to set trap attributes (the direction of allocation, color, width, etc.) of a trap figure to be allocated.

Figure 10:
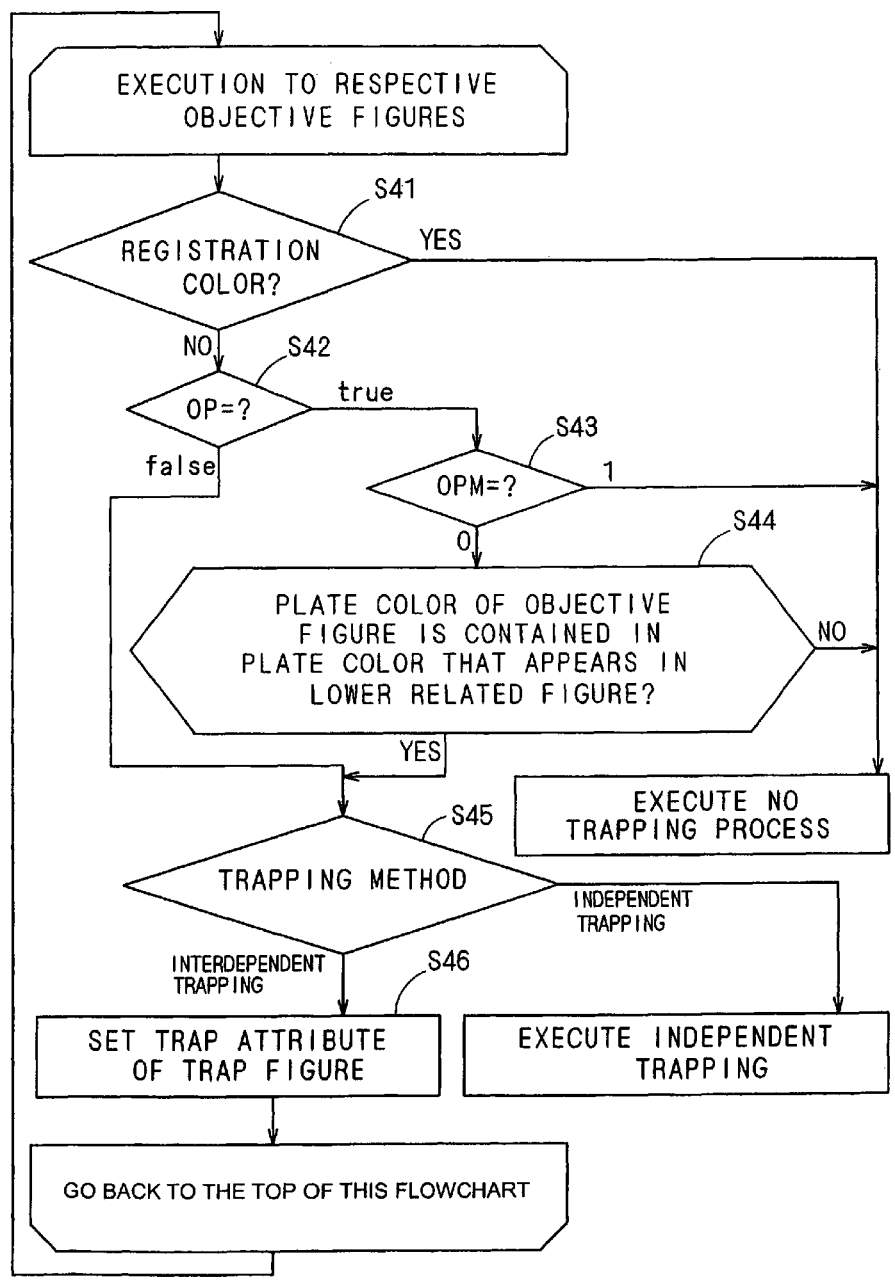
FIGS. 10 and 11 are flowcharts showing the flow of judging process as to whether trapping process is required or not.
Figure 11:
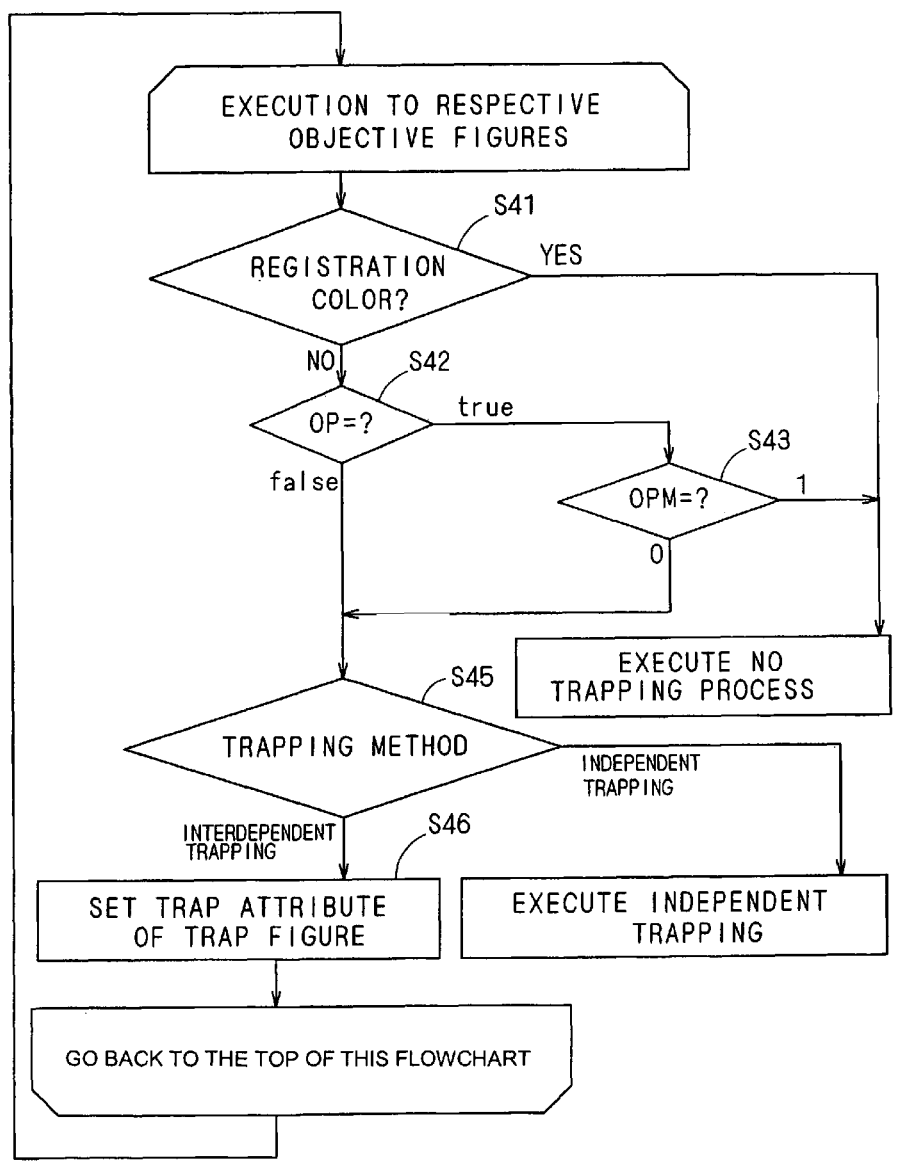

In the flowchart of FIG. 10, no trapping process is executed when the flow advances to "NO" in step S44. Even when trapping process is executed in this case, there is no possible great damage to the appearance of the image. Therefore, in an alternative, the judgment in step S44 may be omitted, so that trapping process is always executed when the overprint attribute of an objective figure is "OP=true, OPM=0." The flowchart of FIG. 11 shows the flow of such judging process. By so doing as in FIG. 11, the burden of the judging process of the operation part 91b can be reduced by the amount of the omission of the judgment in step S44, thus permitting high speed processing.

Step S4 is to set trap attributes by applying the foregoing trap rule to between an objective figure and all the lower related figures thereof. This setting process is executed on the cases where all the figures constituting the image are used as an objective figure. As a result, for example, as shown in FIG. 9, the trap attributes are stored in the related cells concerning the respective lower related figures. The trap attributes stored here are to be referred to when creating a trap figure in step S6 described later.

<5. Extraction of Adjacent Vector>

FIGS. 12 to 15 are diagrams to explain the process of extracting an adjacent vector in step S5. Assume that all of the overprint attributes of FIGS. 32, 42, 43, 52, 53, 62, and 63 shown in FIGS. 12 to 15 are set to "OP=false." Even if they are set to other overprint attribute, the following adjacent vector extracting process is executable.

Step S5 is to extract a zigzagged line or a segment (hereinafter referred to as an "adjacent vector"), which becomes a skeleton of a trap figure to be allocated to a boundary portion between an objective figure and a lower related figure registered in step S3. The adjacent vector can be extracted as a portion of the contour of the objective figure, which contacts (circumscribes or intersects) a lower related figure.

In a specific procedure of extracting process, an intersection between the contour of an objective figure and the contour of a lower related figure is found first. Then, a portion in the contour of the objective figure, which extends from the intersection to the inside of the lower related figure, is extracted and defined as an adjacent vector. When the contour of the objective figure and the contour of the lower related figure make contact with each other, the entire of the portion of the contour of the objective figure, which makes contact with the contour of the lower related figure, is defined as an adjacent vector.

One example of extracting an adjacent vector in an image 30 shown in FIG. 12A will now be described. The image 30 is an image configured by allocating an M color rectangle 31 so as to overlap in its upper part with a C color triangle 32. Therefore, when the triangle 32 is used as an objective figure, the rectangle 31 becomes the lower related figure thereof. When obtaining an adjacent vector therebetween, as shown in FIG. 12B, intersections 33 and 34 between the contour of the triangle 32 and the contour of the rectangle 31 are found first. Then, a portion (indicated by the thick line in FIG. 12B) 32a in the contour of the rectangle 32, which extends from these intersections 33 and 34 to the inside of the contour of the rectangle 31, is extracted and defined as an adjacent vector.

When a plurality of lower related figures are present with respect to one objective figure, an adjacent vector between the objective figure and a lower related figure allocated to a relatively upper position is extracted first and other lower related figures follow in descending order of position. Then, when obtaining an adjacent vector in relation with a lower related figure allocated to a relatively lower position, extracting process is performed by using the contour of the objective figure except for the portion already extracted as an adjacent vector.

Figure 13A:
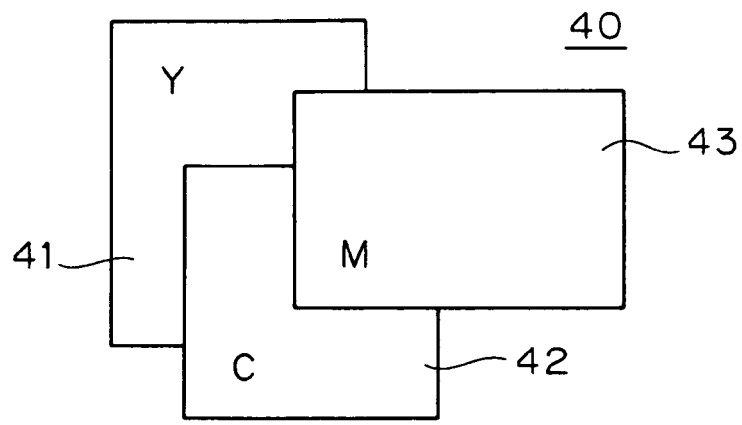
FIGS. 13A, 13B, and 13C are diagrams showing examples of extracting an adjacent vector when a plurality of lower related figures are present with respect to an objective figure.
Figure 13B:
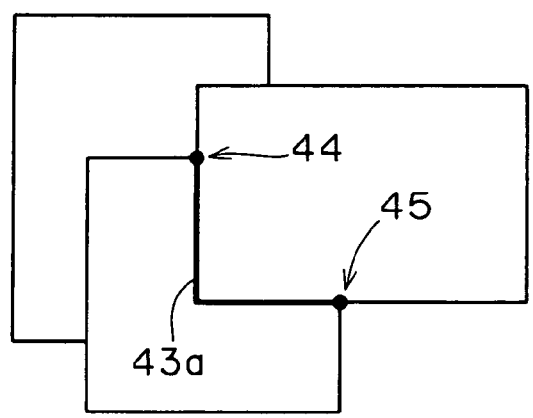
Figure 13C:
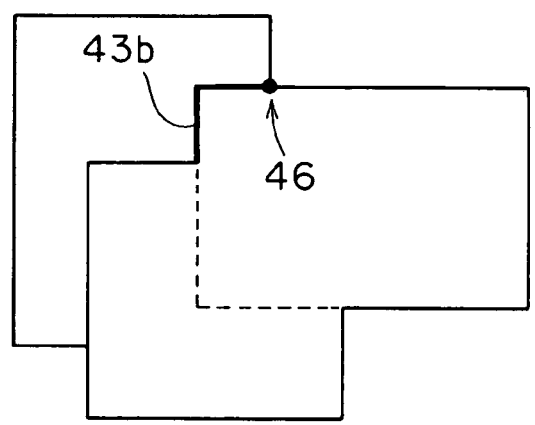

For example, when a rectangle 43 is an objective figure in an image 40 as shown in FIG. 13A, there are two lower related figures thereof, rectangles 41 and 42. In this case, an adjacent vector between the objective figure and the rectangle 42 allocated to a relatively upper position is extracted fast. Here, a portion (indicated by the thick line in FIG. 13B) 43a in the contour of the rectangle 43, which extends from intersections 44 and 45 to the inside of the contour of the rectangle 42, is extracted and defined as an adjacent vector in relation with the rectangle 42. Then, when obtaining an adjacent vector in relation with the rectangle 41 allocated to a relatively lower position, extracting process is performed with use of the contour of the rectangle 43 except for the portion 43a. That is, a portion (indicated by the thick line in FIG. 13C) 43b, which is the contour of the rectangle 43 except for the portion 43a, and extends from an intersection 46 to the inside of the contour of the rectangle 41, is extracted and defined as the adjacent vector in relation with the rectangle 41.

This enables to extract, as an adjacent vector, only the portion where the color of an objective figure and the color of a lower related figure are adjacent each other in appearance, even when there are a plurality of lower related figures. Therefore, a trap figure to be created in step S5 can be created so as to have a suitable color allocation in appearance.

In cases where an upper related figure is present with respect to an objective figure, in consideration of the upper related figure, an adjacent vector is extracted as follows. In the same manner as in the above-mentioned extraction of adjacent vectors, an adjacent vector between the objective figure and the upper related figure is specified first. Then, an adjacent vector in relation with a lower related figure is extracted by using the contour of the objective figure except for the portion specified as the adjacent vector in relation with the upper related figure.

An extracting procedure of adjacent vectors in consideration of an upper related figure will now be described by using an image 50 shown in FIG. 14A, as example. The image 50 is one in which an M color rectangle 51 is allocated so as to overlap in its upper part with a K color annular shape 52, and on a further upper side than that, a C color rectangle 53 is allocated so as to contact with the inside edge of the annular shape 52. When the annular shape 52 is used as an objective figure in the image 50, the rectangle 51 is the lower related figure, and the rectangle 53 is the upper related figure. In this case, an adjacent vector between the annular shape 52 and the rectangle 53 is specified first. As a result, an inside edge portion (indicated by the thick line in FIG. 14B) 52a of the annular shape 52 is the adjacent vector in relation with the rectangle 53. Then, an adjacent vector in relation with the rectangle 51 is extracted by using the contour of the annular shape 52 except for the inside edge portion 52a. That is, a portion (indicated by the thick line in FIG. 14C) 52b, which is the contour of the rectangle 52 except for the inside edge portion 52a, and extends from intersections 54 and 55 to the inside of the contour of the rectangle 51, is extracted and defined as the adjacent vector in relation with the rectangle 51.

This enables to extract, as an adjacent vector, only the portion where the color of an objective figure and the color of a lower related figure are adjacent each other in appearance, even when an upper related figure is present with respect to the objective figure. Accordingly, also in the subsequent step S6, trapping process is executable without generating any unwanted color component on the image.

Figure 14A:
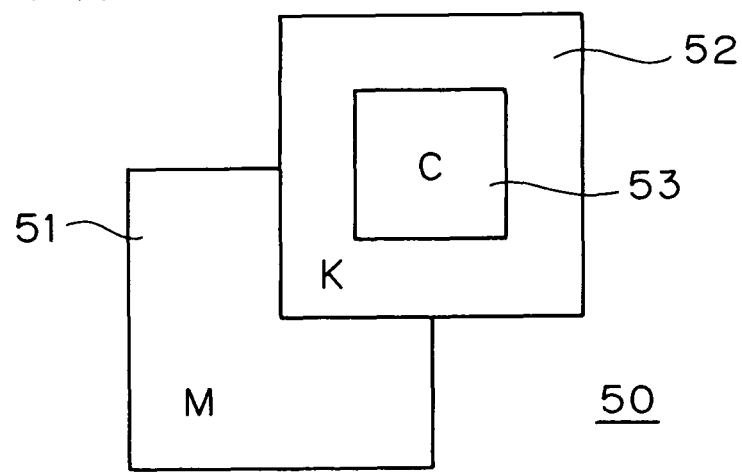
FIGS. 14A, 14B, 14C, 15A, 15B, and 15C are diagrams showing examples of extracting an adjacent vector when an upper related figure is present in an objective figure.
Figure 14B:
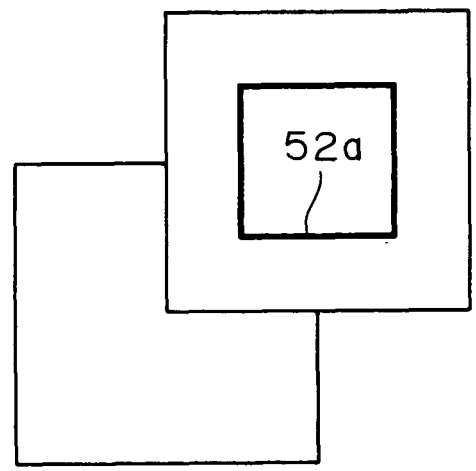
Figure 14C:
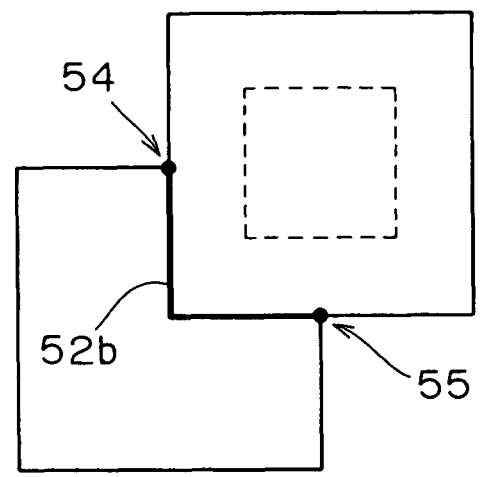
Figure 15A:
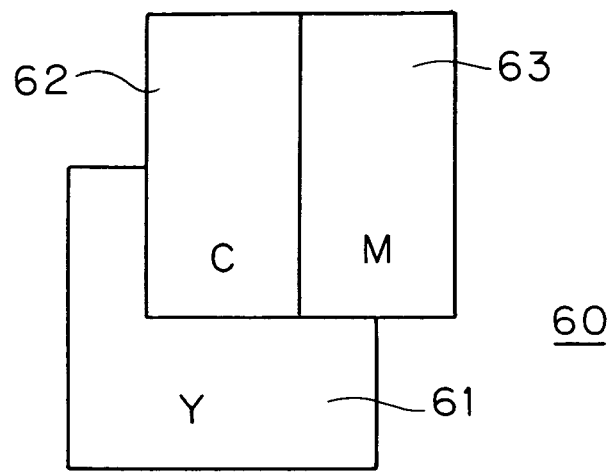
Figure 15B:
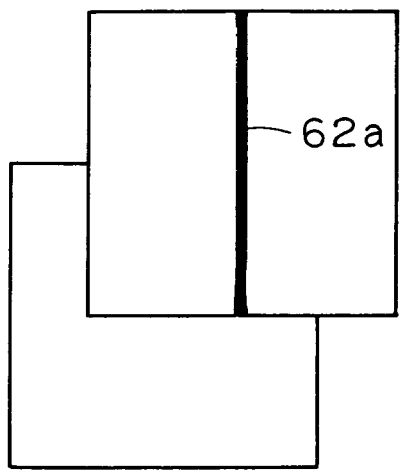
Figure 15C:
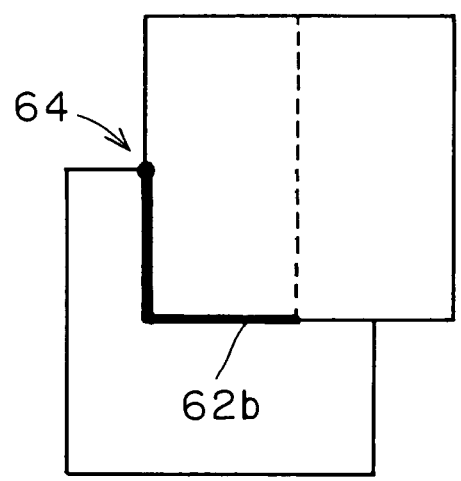

Although FIGS. 14A to 14C show the cases where the objective figure is an annular shape and the upper related figure is allocated so as to contact with the inside edge thereof, without limiting to these allocation relationships, this extracting process is also applicable to general cases where an upper related figure is present with respect to an objective figure. For example, this extracting process is applicable to such cases as in the image 60 shown in FIG. 15, where the rectangle 62 is allocated to the upper side of the rectangle 61, and the rectangle 63 is allocated to the uppermost position so as to be adjacent to the rectangle 62. In the image 60, when the rectangle 62 is an objective figure, the rectangle 61 is the lower related figure, and the rectangle 63 is the upper related figure. In this case, a segment (a portion indicated by the thick line in FIG. 15B) 62a is specified first, which becomes an adjacent vector in relation with the rectangle 63 that is the upper related figure. Then, a portion (indicated by the thick line in FIG. 15C) 62b, which is the contour of the rectangle 62 except for the segment 62a, and extends from an intersection 64 to the inside of the contour of the rectangle 61, is extracted and defined as the adjacent vector in relation with the rectangle 61. Also in this case, the portion 62a in which the color of the rectangle 62 and the color of the rectangle 63 are adjacent each other is excluded, and only the portion 62b in which the color of the rectangle 62 and the color the rectangle 61 are adjacent each other can be extracted as the adjacent vector.

In step S5, the adjacent vectors between one objective figure and all the lower related figures are extracted in the above-mentioned method. Then, such extracting process of adjacent vectors is executed on the cases where all the figures constituting the image are used as an objective figure. As a result, for example, as shown in FIG. 9, the information specifying the adjacent vectors is stored in the related cells of the respective lower related figures. The subsequent step S6 is to create a trap figure by using the adjacent vectors stored here, as a skeleton.

<6. Creation of Trap Figure>

Step S6 is to create a trap figure by using the adjacent vector extracted in step S5, as a skeleton, and assigning thereto a direction, a color, a width and the like, based on the trap attributes set in step S4. The created trap figure is then allocated. This processing is executed to all the related cells by referring to the adjacent vectors and the trap attributes stored in the above-mentioned related cells.

However, in the objective figure to which the setting is performed so as to employ "independent trapping," trapping process is executed based on the method of "independent trapping." If setting is performed so as not to execute trapping process, no trapping process is executed.

Thus, the sequence of trapping process is completed. The image after being subjected to trapping process is outputted from the computer 91 shown in FIG. 1, as data described in a format such as PDF or the like. This data is then sent via the network 92 to the raster image processor (RIP) 93, and subjected to RIP process. The image after being subjected to RIP process is then sent to the image setter 94 and the printer 95, and then subjected to the subsequent image output processing.

Thus in accordance with the present invention, in an image configured by allocating a plurality of figures, it is judged whether trapping process is required or not, based on the color state in a portion where the figures overlap. Specifically, when the overprint attribute of an objective figure is "OP=false," or when the overprint attribute of an objective figure is "OP=true, OPM=O," and the plate colors defining the color of the objective figure are contained in the plate colors that appear in a lower related figure, it is judged that trapping process is required, and trapping process is executed. Generally speaking, when at least regarding to a portion where an objective figure and a lower related figure overlap, the plate color value of the lower related figure is erased or overwritten, trapping process is executed to this objective figure. By so doing, trapping process is executable only when there is the danger that a gap occurs in a boundary portion. That is, trapping process in response to the needs is realizable.

While the invention has been shown and described in detail, the foregoing description is in all aspects illustrative and not restrictive. It is therefore understood that numerous modifications and variations can be devised without departing from the scope of the invention.

What is claimed is:

1. A trapping method for performing a trapping process, in an image configured by allocating a plurality of figures having a relative order of upper and lower position, to a boundary portion where two different colors are adjacent each other, the method comprising the steps of:

a) using in sequence all figures constituting said image as an objective figure and assigning one of the following attributes (1) to (3) to said objective figure:

(1) a portion overlapping with a relatively lower figure employs a color of said objective figure;

(2) a portion overlapping with the relatively lower figure employs a combination color of said color of said objective figure and a color of the relatively lower figure; and (3) a portion overlapping with the relatively lower figure employs a color of said objective figure under a first requirement, and employs a combination color of said color of said objective figure and a color of the relatively lower figure under a second requirement; and b) performing a setting so as to execute the trapping process when said attribute (1) or (3) is assigned to a relatively upper figure, and performing a setting so as not to execute the trapping process when said attribute (2) is assigned to the relatively upper figure at an overlapping portion where the relatively upper figure and the relatively lower figure of said plurality of figures are allocated to overlap.

2. A trapping apparatus for performing a trapping process, in an image configured by allocating a plurality of figures having a relative order of upper and lower position, to a boundary portion where two different colors are adjacent each other, the apparatus comprising:

an assigning part for using in sequence all figures constituting said image as an objective figure and assigning one of the following attributes (1) to (3) to said objective figure:

(1) a portion overlapping with a relatively lower figure employs a color of said objective figure;

(2) a portion overlapping with the relatively lower figure employs a combination color of said color of said objective figure and a color of the relatively lower figure; and (3) a portion overlapping with the relatively lower figure employs a color of said objective figure under a first requirement, and employs a combination color of said color of said objective figure and a color of the relatively lower figure under a second requirement; and a setting part for performing a setting so as to execute the trapping process when said attribute (1) or (3) is assigned to a relatively upper figure, and for performing a setting so as not to execute the trapping process when said attribute (2) is assigned to the relatively upper figure at an overlapping portion where the relatively upper figure and the relatively lower figure of said plurality of figures are allocated to overlap.

3. A computer-readable medium encoded with a computer program, the program having said computer execute the following processing steps of:

a) using in sequence all figures constituting an image as an objective figure and assigning one of the following attributes (1) to (3) to said objective figure in an image configured by allocating a plurality of figures having a relative order of upper and lower position;

(1) a portion overlapping with a relatively lower figure employs a color of said objective figure;

(2) a portion overlapping with the relatively lower figure employs a combination color of said color of said objective figure and a color of the relatively lower figure; and (3) a portion overlapping with the relatively lower figure employs a color of said objective figure under a first requirement, and employs a combination color of said color of said objective figure and a color of the relatively lower figure under a second requirement; and b) performing a setting so as to execute a trapping process when said attribute (1) or (3) is assigned to a relatively upper figure, and performing a setting so as not to execute the trapping process when said attribute (2) is assigned to the relatively upper figure at an overlapping portion where the relatively upper figure and the relatively lower figure of said plurality of figures are allocated to overlap.

4. A printing system comprising:

a computer for performing trapping processing; and an output part for outputting an image after being subjected to the trapping processing by said computer, wherein under a predetermined program, said computer executes the following processing of:

a) using in sequence all figures constituting said image as an objective figure and assigning one of the following attributes (1) to (3) to said objective figure in an image configured by allocating a plurality of figures having a relative order of upper and lower position:

(1) a portion overlapping with a relatively lower figure employs a color of said objective figure;

(2) a portion overlapping with the relatively lower figure employs a combination color of said color of said objective figure and a color of the relatively lower figure; and (3) a portion overlapping with the relatively lower figure employs a color of said objective figure under a first requirement, and employs a combination color of said color of said objective figure and a color of the relatively lower figure under a second requirement, b) performing a setting so as to execute the trapping processing when said attribute (1) or (3) is assigned to a relatively upper figure, and performing a setting so as not to execute the trapping processing when said attribute (2) is assigned to the relatively upper figure at an overlapping portion where the relatively upper figure and the relatively lower figure of said plurality of figures are allocated to overlap.

* * * * *